United States Patent Office 3,337,534
Patented Aug. 22, 1967

3,337,534
CERTAIN N-OXYGENATED AZEPINE DERIVATIVES
Herbert Schröter, Reinach, Basel-Land, and Daniel A. Prins, Oberwil, Basel-Land, Switzerland, assignors to Geigy Chemical Corporation, a corporation of Delaware
No Drawing. Filed Mar. 8, 1965, Ser. No. 438,058
Claims priority, application Switzerland, Mar. 16, 1964, 3,348/64, 3,349/64
14 Claims. (Cl. 260—239)

The present invention concerns new azepine derivatives and processes for the production of these compounds which are valuable pharmaceuticals and intermediate products for the production of such pharmaceuticals.

The compounds according to the invention are those of the formula

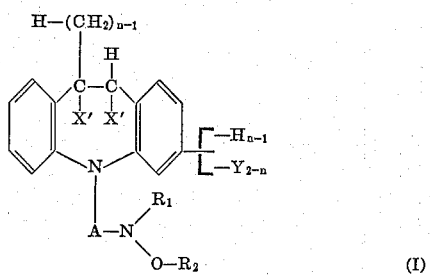

(I)

wherein $n$ is one of the integers 1 and 2, both $X'$ represent two hydrogen atoms or, together, a second linkage between the carbon atoms to which the $X'$ are attached, Y represents one of the following: chlorine, alkoxy of from 1 to 5 carbon atoms, lower alkylthio, trifluoromethyl, lower alkanoyl, lower alkyl-sulfonyl, or lower alkyl-substituted sulfamyl,

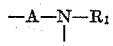

represents one of the following groupings:

(a)

wherein "alkylene" has from two to four carbon atoms at least two of which are straight-enchained between the two nitrogen atoms in the above formula,
  (b) C-pyrrolidinyl-alkyl,
  (c) C-piperidinyl-alkyl,
  (d) C-hexahydroazepinyl-alkyl,
"alkyl" in (b), (c) and (d) having from one to two carbon atoms, and $R_2$ represents hydrogen or the monovalent acyl radical of a preferably saturated aliphatic or of a mononuclear carbocyclic aromatic hydrocarbon mono- or dicarboxylic acid having a total of at least 2 and not more than 10 carbon atoms, and possess valuable pharmacological properties; in particular they act on the central and also the peripheral nervous systems; they antagonize the action of reserpine and tetrabenazine and potentiate that of noradrenaline, and are useful in the treatment of mental disorders, in particular of depressions.

The compounds of Formula I can be administered orally or rectally and, in the form of aqueous solutions of their salts, also parenterally.

When Y is a lower alkoxy radical, it represents the methoxy, ethoxy, n-propoxy, isopropoxy, n-butoxy, sec. butoxy, n-amyloxy or the isoamyloxy group; as lower alkylthio radical it represents the methylthio, ethylthio, or isopropylthio radical and as lower alkyl-substituted sulfamyl radical it represents the N,N-dimethylsulfamyl, N,N-diethylsulfamyl, N,N-dipropylsulfamyl, N,N-di-(n-butyl)-sulfamyl or the N,N-di-(sec.butyl)-sulfamyl group.

A being alkylene represents the ethylene, propylene, ethylethylene, trimethylene, 1-methyltrimethylene and 2-methyltrimethylene radical and when the group

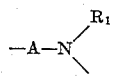

represents the C-pyrrolidinylalkyl, C-piperidinylalkyl or C-hexahydroazepinylalkyl radical, then this is, e.g. the 2-(2'-pyrrolidinyl)-ethyl, 2-(2'-piperidinyl)-ethyl, 2-(2'-hexahydroazepinyl)-ethyl, 3-pyrrolidinylmethyl, 3-piperidinylmethyl, 3-hexahydroazepinylmethyl, 4-piperidinylmethyl or the 4-hexahydroazepinylmethyl radical.

As acyl radical of an aliphatic or non-condensed aromatic mono- or dicarboxylic acid, $R_2$ represents, e.g. the acetyl, propionyl, n-butyryl, isobutyryl, valeryl, isovaleryl, 2-methylbutyryl, pivalyl, 3-carboxy-propionyl radical, also the benzoyl radical, a mono-, di-, trimethyl-benzoyl radical, particularly the 2,6-dimethyl- and 2,4,6-trimethyl-benzoyl radical or an o-carboxy-benzoyl radical.

"Lower" used in this specification and the appended claims together with an aliphatic radical means that the latter has not more than 4 carbon atoms unless expressly defined otherwise.

The new compounds of Formula I are produced by reacting, in an inert solvent, a secondary amine of the formula

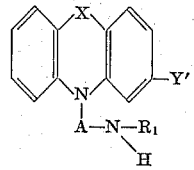

(II)

wherein

Y' has the same meaning as in Formula I as well as hydrogen,

X represents an ethylene or vinylene group which can be substituted by a methyl group if Y' is hydrogen, and A and $R_1$ have the same meanings as in Formula I, with an acyl peroxide to form an N-acyloxy compound of the formula

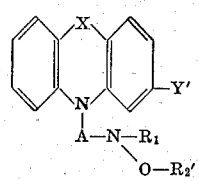

(III)

wherein X, Y', A and $R_1$ have the meanings given hereinbefore, and $R_2'$ has the meanings of $R_2$ except hydrogen and, if desired, solvolysing the N-acyloxy compounds obtained and converting the compounds obtained of Formula I wherein $R_2$ is hydrogen, if desired with a carboxylic acid chloride or anhydride, into an O-acyl derivative of general Formula I. Finally, also if desired, the compounds of general Formula I obtained wherein $R_2$ is hydrogen are converted into their salts with inorganic and organic acids.

In the reaction of an acyl peroxide with a compound of general Formula II, an equimolar amount of a monocarboxylic acid is liberated or, on using an acyl peroxide of a dicarboxylic acid, the acyl radical $R_2'$ has a free carboxyl group. In both cases, the corresponding amount of starting materials of general Formula II are bound as salt and so removed from the reaction.

It is of advantage to use the basic starting material as acid binding agent, i.e. to react the acyl peroxide with double the equivalent amount of amine of general Formula II. The amine of Formula II can be liberated from the salt formed, by means of a base and again reacted with diacyl peroxide.

The amines of general Formula II are converted into compounds of the general Formula III adding a solution of an acyl peroxide, in particular that of the acetyl peroxide, benzoyl peroxide or acetyl-benzoyl peroxide, to that of an amine of the general Formula II or, in reverse, by taking the solution of an acyl peroxide and adding that of an amine to it—and maintaining a reaction temperature of about −50° to +80° C., preferably from 0 to 20°. Suitable solvents for the amines and acyl peroxides are chlorinated hydrocarbons such as, e.g. chloroform or carbon tetrachloride, ether-like substances such as, e.g. diethyl ether or tetrahydrofuran, and also hydrocarbons such as, e.g. benzene or toluene.

The products obtained, i.e. the N-acyloxy compounds of general Formula III, can be solvolysed, e.g. with an alkali hydroxide, particularly potassium hydroxide, in an aqueous, low alkanol such as, e.g. methanol or ethanol, to form the compounds of the general Formula I, in which $R_2$ represents hydrogen. Instead of aqueous, alcoholic alkali hydroxide, also an alkali alcoholate such as, e.g. sodium methylate, can be used for the solvolysis in a low alkanol such as, e.g. methyl alcohol.

As examples of starting materials of Formula II can be mentioned: the 5-(2′-aminoethyl), 5-(2′-amino-1′-methylethyl), 5-(2′-aminopropyl), 5-(3′-aminopropyl), 5-(3′-amino-2′-methylpropyl), 5-(4′-aminobutyl), 5-(2′-methylaminoethyl), 5-(2′-methylamino-1′-methylethyl), 5-(2′-methylaminopropyl), 5-(3′-methylaminopropyl), 5-(3′-methylamino - 2′ - methylpropyl), 5-[2′-(2″-pyrrolidinylethyl)], 5-[2′-(2″-piperidinylethyl)] and 5-[2′-(2″-hexahydroazepinylethyl)] derivatives of 5H-dibenz[b,f]azepine, 10-methyl-5H-dibenz[b,f]azepine, 10,11 - dihydro-5H-dibenz[b,f]azepine and 10-methyl-10,11-dihydro-5H-dibenz[b,f]azepine as well as the 3-chloro-, 3-methoxy-, 3-ethoxy-, 3-methylthio-, 3-ethylthio-, 3-(N,N-dimethyl-sulphamyl)- and 3-(N,N-diethyl-sulphamoyl)-5H-dibenz[b,f]azepine, and corresponding 10,11-dihydro-5H-dibenz[b,f]azepines.

As mentioned above, the new compounds are administered perorally, rectally and parenterally. The daily dosages of the free bases or of non-toxic salts thereof vary between 10 and 600 mg. for adult patients. Suitable dosage units such as dragées (sugar coated tablets), tablets, suppositories or ampoules, preferably contain 5–50 mg. of an active substance according to the invention or of its non-toxic salts.

By non-toxic salts of the bases usable according to the invention are meant salts of such acids the acid components of which are pharmacologically acceptable in the applicable dosages, i.e. those which have no toxic effects. It is also sometimes of advantage if the salts to be used crystallise well and are not or are only slightly hygroscopic. Examples of non-toxic salts are the salts with hydrochloric acid, hydrobromic acid, sulphuric acid, phosphoric acid, methane sulphonic acid, ethane sulphonic acid, β-hydroxyethane sulphonic acid, camphoric acid and ethane disulphonic acid. These can be used as active ingredients instead of the free bases.

Dosage units for peroral application contain, as active substance, preferably between 1% and 90% of a compound of the general Formula I or a non-toxic salt thereof. They are produced by combining the active substance with, e.g. solid, pulverulent carriers such as lactose, saccharose, sorbitol, mannitol; starches such as potato starch, corn starch or amylopectin, also laminaria powder or citrus pulp powder; cellulose derivatives or gelatines, optionally with the addition of lubricants such as magnesium or calcium stearate or polyethylene glycols (Carbowaxes) of suitable molecular weights, to form tablets or dragée cores. The latter are coated, for example, with concentrated sugar solutions which can also contain, e.g. gum arabic, talcum and/or titanium dioxide, or by coating them with a lacquer dissolved in easily volatile organic solvents or mixtures of solvents. Dyestuffs can be added to these coatings, for example, to differentiate between varying dosages.

Examples of dosage units for rectal application are suppositories consisting of a combination of an active substance or a suitable salt thereof with a neutral fatty foundation, or also gelatine rectal capsules which consist of a combination of the active substance or a suitable salt thereof with polyethylene glycols (carbowaxes) of a suitable molecular weight.

Ampoules for parenteral, in particular intramuscular, administration preferably contain a water soluble salt of an active substance in a concentration of preferably 0.5–5%, optionally together with suitable stabilising agents and buffer substances, in aqueous solution.

A method further illustrating the production of both tablets and dragées is given below:

(a) 250 g. of N-[3-(3′-chloro-10′,11′-dihydro-5′H-dibenz[b,f]azepin-5′-yl) - propyl]-N-methyl-hydroxylamine hydrogen sulphate are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicium dioxide are mixed in and the mixture is pressed into 10,000 tablets. Each tablet weighs 100 mg. and contains 25 mg. of active substance (hydrogen sulphate) and, if desired, can be grooved for better adaptation of the dosage.

(b) A granulate is produced from 250 g. of N-[3-(3′-chloro-10′,11′-dihydro - 5′H - dibenz[b,f]azepin-5′-yl)-propyl]N-methylhydroxylamine hydrogen sulphate, 175.90 g. of lactose and the alcoholic solution of 10 g. of stearic acid. After drying, the granulate is mixed with 56.60 g. of colloidal silicium dioxide, 165 g. of talcum, 20 g. of potato starch and 2.50 g. of magnesium stearate and is then pressed into 10,000 dragée cores. These are then coated with a concentrated syrup consisting of 502.28 g. of crystallised saccharose, 6 g. of shellack, 10 g. of gum arabic, 0.22 g. of dyestuff and 1.5 g. of titanium dioxide and dried. Each of the dragées obtained weighs 120 mg. and contains 25 mg. of active substance.

The following examples further illustrate the production of new compounds of general Formula I which have not been known up to the present, but they in no way represent the only methods of producing same. The temperatures are given in degrees centigrade.

Antidepressive azepine derivatives falling under Formula I, in which $R_2$ is hydrogen, comprise, when referred to in the appended claims, the acid additive salts of these derivatives.

*Example 1*

(a) 30 g. of moistened 82% benzoyl peroxide are dissolved in 70 ml. of chloroform. This solution is dried over sodium sulphate and diluted with 130 ml. of anhydrous ether. A solution of 27 g. of 5-(3′-methylaminopropyl)-10,11-dihydro-5H-dibenz[b,f]azepine in 200 ml. of diethyl ether is then added dropwise at 0–5°, the addition being made within 1 hour while stirring, the cooling bath is removed and the reaction mixture is left to stand for 2–4 hours at 20° after which it is seeded with the benzoic salt of the starting base and cooled to 0°. The precipitate formed, the benzoic acid salt of 5-(3′-methylaminopropyl)-10,11-dihydro-5H-dibenz[b,f]azepine, is filtered off under suction and is washed with dry diethyl ether. The filtrate is evaporated in vacuo; the residue, the N-[3-(10′,11′-dihydro - 5′H - dibenz[b,f]azepin-5′-yl)-propyl]-N-methyl-O-benzoyl-hydroxylamine obtained, crystallises on standing and, after recrystallisation from methanol, it melts at 120–122°.

In a variation of this method, the temperature during the dropwise addition of the dissolved starting base is 20° instead of 0 to 5°.

Example 2

The following compounds are obtained analogously to Example 1 with benzoyl peroxide:

(a) From 5-[2-(2'-piperidinyl)-ethyl] - 10,11 - dihydro - 5H - dibenz[b,f]azepine, N-benzoyloxy-2-[2'-(10″, 11″-dihydro - 5″H - dibenz[b,f]azepin - 5″ - yl)-ethyl]-piperidine, M.P. 132°, (b) From 5-(2'-methylaminoethyl) - 10,11 - dihydro-5H-dibenz[b,f]azepine, N-[2-(10',11'-dihydro - 5'H - dibenz[b,f]azepin-5'-yl)-ethyl] - N - methyl-O-benzoyl-hydroxylamine, M.P. 130–132°, (c) From 5-(3'-methylaminopropyl) - 5H - dibenz[b,f]azepine, N-[3-(5'H-dibenz[b,f]azepin - 5' - yl)-propyl]-N-methyl-O-benzoyl-hydroxylamine, M.P. 124–126° from diethyl ether-pentane, (d) From 5-(3'-methylaminopropyl) - 10 - methyl-10, 11-dihydro - 5H - dibenz[b,f]azepine, N-[3-(10'-methyl-10',11'-dihydro - 5'H - dibenz[b,f]azepin-5'-yl)-propyl]-N-methyl-O-benzoyl-hydroxylamine, M.P. 91–93° from diethyl ether-pentane, (e) From 5-(3'-methylamino - 2' - methylpropyl)-10, 11-dihydro - 5H - dibenz[b,f]azepine, N-[3-(10',11'-dihydro-5'H-dibenz[b,f]azepin-5'-yl) - 2 - methylpropyl]-N-methyl-O-benzoyl-hydroxylamine, M.P. 147–148°, (f) From 5-(3'-methylamino-propyl) - 10 - methyl-5H-dibenz[b,f]azepine, N-[3-(10'-methyl-5H-dibenz[b,f]-azepin-5'-yl)-propyl] - N - methyl-O-benzoyl-hydroxylamine, (g) From 5-(4'-methylamino-butyl) - 10,11-dihydro-5H-dibenz[b,f]azepine, N-[4-(10',11'-dihydro - 5'H - dibenz[b,f]azepin - 5' - yl)-butyl]-N-methyl-O-benzoyl-hydroxylamine, (h) From 5-[(3'-piperidinyl)-methyl] - 10,11 - dihydro - 5H - dibenz[b,f]azepine, N-benzoyloxy-3[(10',11'-dihydro - 5'H - dibenz[b,f]azepine-5'-yl)-methyl]-piperidine, (i) From 5-[(3'-pyrrolidinyl)-methyl] - 10,11 - dihydro - 5H - dibenz[b,f]azepine, N-benzoyloxy-3[(10',11'-dihydro-5'H-dibenz[b,f]azepin - 5' - yl)-methyl]pyrrolidine, and (j) From 5-[(3'-hexahydro-azepinyl) - methyl]-10,11-dihydro - 5H - dibenz[b,f]azepine, N-benzoyloxy-3[(10', 11'-dihydro-5'H-dibenz[b,f]azepin - 5' - yl)-methyl]-hexahydro-azepine.

Example 3

5.4 g. of 5-(3'-methylaminopropyl)-10,11-dihydro-5H-dibenz[b,f]azepine are dissolved in 60 ml. of diethyl ether. A solution of 1.6 g. of phthaloyl peroxide in 20 ml. of chloroform is added dropwise to this solution at 0–5° over a period of 1 hour while stirring. After stirring for another hour at 20°, the reaction solution is exhaustively extracted at 0–5° with 2 N HCl and then with 5% potassium bicarbonate solution. After making the solution alkaline and extracting with diethyl ether, the hydrochloric acid extracts yield 2.7 g. of the amine used as starting material. The potassium bicarbonate extracts are made acid to Congo paper with 2 N hydrochloric acid at 0° and extracted with diethyl ether. The ether extract is dried over sodium sulfate and the solvent is removed in vacuo, amorphous N-[3-(10',11'-dihydro-5'H - dibenz-[b,f]azepin - 5' - yl) - propyl] - N - methyl - O - (2″-carboxybenzoyl)-hydroxylamine is obtained.

$R_f$ 0.34 [thin layer chromatogram on kieselgur (neutral) eluant=benzol:methanol 3:1].

Example 4

17.8 g. of N-[3-(10',11'-dihydro-5'H-dibenz[b,f]azepin - 5' - yl) - propyl] - N - methyl - O - benzoyl - hydroxylamine are dissolved in 450 ml. of boiling ethanol and first 100 ml. of water and then 100 ml. of 2 N potassium hydroxide solution are added. The solution is cooled to 20°, left to stand for 15 minutes at 20° and the methanol is evaporated in vacuo. The residue is diluted with 200 ml. of water and the aqueous phase is thoroughly extracted with diethyl ether. The ethereal extract is dried over sodium sulfate and concentrated in vacuo. The residue crystallizes spontaneously. Recrystallization from diethyl ether-pentane yields N-[3-(10',11'-dihydro-5'H-dibenz[b,f]azepin - 5' - yl) - propyl] - N - methyl - hydroxylamine, M.P. 104–105°. The hydrogen sulfate is prepared from the free base (concentrated methanolic solution) with aqueous sulfuric acid. It is recrystallized from methanol in the presence of a small amount of 2 N sulfuric acid. M.P. after drying 163–165°.

Example 5

The following compounds are obtained analogously to Example 4 with ethanolic potassium hydroxide solution:

(a) From N - benzoyloxy - 2 - [2' - (10″,11″ - dihydro - 5″H - dibenz[b,f]azepin - 5″ - yl) - ethyl] - piperidine, there is obtained N-hydroxy-2-[2'-(10″,11″-dihydro - 5″H - dibenz[b,f]azepin - 5″ - yl) - ethyl] - piperidine, M.P. 146–147°, (b) From N - [2 - (10',11' - dihydro - 5'H - dibenz-[b,f]azepin - 5' - yl) - ethyl] - N - methyl - O - benzoyl-hydroxylamine, N - [2 - (10',11' - dihydro - 5'H - dibenz-[b,f]azepin - 5' - yl) - ethyl] - N - methyl - hydroxylamine, M.P. 129–131° from diethyl ether-pentane, (c) From N - [3 - (5'H - dibenz[b,f]azepin - 5' - yl)-N - methyl - O - benzoyl - hydroxylamine, N - [3 - (5'H-dibenz[b,f]azepine - 5' - yl) - propyl] - N - methyl - hydroxylamine, M.P. 116–118° from diethyl ether-pentane, (d) From N - [3 - (10' - methyl - 10',11' - dihydro-5'H - dibenz[b,f]azepin - 5' - yl) - propyl] - N - methyl-O - benzoyl - hydroxylamine, N - [3 - (10' - methyl-10',11' - dihydro - 5'H - dibenz[b,f]azepin - 5' - yl)-propyl]-N-methyl-hydroxylamine, M.P. 105–106° from diethyl ether-pentane, (e) From N - [3 - (10',11' - dihydro - 5H - dibenz-[b,f]azepin - 5' - yl) - 2 - methylpropyl] - N - methyl-O - benzoyl - hydroxylamine, N - [3 - (10',11' - dihydro-5'H - dibenz[b,f]azepin - 5' - yl) - 2 - methylpropyl] - N-methyl-hydroxylamine. The latter is converted into the hydrochloride with ethereal hydrochloric acid; M.P. after recrystallization from acetone, 152–155°.

(f) From N - [3 - (10' - methyl - 5'H - dibenz[b,f] azepin - 5' - yl) - propyl] - N - methyl - O - benzoyl - hydroxylamine, N - [3 - (10' - methyl - 5'H - dibenz[b,f] azepin-5'-yl)-propyl]-N-methyl-hydroxylamine, (g) From N - [4 - (10',11' - dihydro - 5'H - dibenz-[b,f]azepin - 5' - yl) - butyl] - N - methyl - O - benzoyl-hydroxylamine, N - [4 - (10',11' - dihydro - 5'H - dibenz-[b,f]azepin-5'-yl)-butyl]-N-methyl-hydroxylamine, (h) From 1 - benzoyloxy - 3[(10',11' - dihydro - 5'H-dibenz[b,f]azepin - 5' - yl) - methyl] - piperidine, 1 - hydroxy - 3[(10',11' - dihydro - 5'H - dibenz[b,f]azepin-5'-yl)-methyl]-piperidine, (i) From 1 - benzoyloxy - 3[(10',11' - dihydro - 5'H-dibenz[b,f]azepin - 5' - yl) - methyl] - pyrrolidine, 1 - hydroxy - 3[(10',11' - dihydro - 5'H - dibenz[b,f]azepin-5'-yl)methyl]-pyrrolidine, and (j) From 1 - benzoyloxy - 3[(10',11' - dihydro - 5'H-dibenz[b,f]azepin - 5' - yl) - methyl] - hexahydro - azepine, 1 - hydroxy - 3[(10',11' - dihydro - 5'H - dibenz-[b,f]azepin-5'-yl)-methyl]-hexahydro-azepine.

Example 6

17.8 g. of N-[3-(10',11'-dihydro-5'H-dibenz[b,f]azepin - 5' - yl) - propyl] - N - methyl - O - benzoyl - hydroxylamine are suspended in 100 ml. of anhydrous methanol, 1 g. of sodium methylate is added and dissolved while gently heating. The reaction mixture is left to stand for 2 hours at 20° whereupon it is refluxed for 5 minutes and then evaporated in vacuo. The residue is taken up with diethyl ether and water, the ethereal phase is washed with water and thoroughly extracted with 2 N hydrochloric acid. The hydrochloric acid extract is made alkaline with concentrated sodium hydroxide solution and the organic bases are extracted with diethyl ether. The ethereal solution is washed with water, dried over sodium sulphate and evaporated in vacuo. The residue is crystallized from petroleum ether. The N-[3-(10′,11′-dihydro-5′H - dibenz[b,f]azepin - 5′ - yl) - propyl] - N - methyl-hydroxylamine obtained has a melting point of 103–105° C.

Example 7

5.65 g. of N-[3-(10′,11′-dihydro-5′H-dibenz[b,f]azepin-5′-yl)-propyl-N-methyl-hydroxylamine are dissolved in 20 ml. of anhydrous pyridine and 2.1 g. of succinic acid anhydride are added at 0°. The reaction mixture is then left to stand for 24 hours at 25°, whereupon the pyridine is distilled off under vacuum.

The residue is taken up in diethyl ether and washed with water and 2 N hydrochloric acid. The ethereal phase is then extracted at 0–5° with 2 N sodium bicarbonate solution. The bicarbonate extracts are then made acid to Congo paper at 0–5° with concentrated hydrochloric acid and then exhaustively extracted with chloroform. After drying over sodium sulfate and evaporating in vacuo, amorphous N-[3-(10′,11′-dihydro-5′H-dibenz[b,f]azepin-5′-yl)-propyl] - N-methyl-O-(3-carboxy-propionyl) - hydroxylamine is obtained. $R_f$=0.36. [Thin layer chromatogram on kieselgur (neutral), eluant: benzene/ methanol (volume ratio 3:1]).

Example 8

5.65 g. of N[3-(10′,11′-dihydro-5′H-dibenz[b,f]azepin-5′-yl) propyl]-N-methyl-hydroxylamine are dissolved in 30 ml. of anhydrous pyridine and the solution is cooled to 0°. 2.00 g. of acetanhydride are added to this solution and the reaction product is left to stand for 15 hours at 25°. The pyridine is then distilled off under vacuum. The residue is taken up with water and diethyl ether. The ethereal phase is washed with water, 2 N hydrochloric acid and with water, dried over sodium sulfate and evaporated to dryness. N-[3-(10′,11′-dihydro-5′H-dibenz[b,f] azepin-5′-yl)-propyl] - N-methyl-O-acetyl-hydroxylamine is obtained which crystallizes from diethyl ether/petroleum ether. M.P. 61°.

Example 9

The following compounds are obtained analogously to Example 8:

From N-[3-(10′,11′-dihydro-5′H-dibenz[b,f]azepin-5′-yl)-propyl]-N-methyl-hydroxylamine:

(a) With pivalyl chloride N-[3-(10′,11-dihydro-5′H-dibenz[b,f]azepin-5′-yl) - propyl] - N-methyl - O-pivalyl-hydroxylamine, $R_f$=0.67. [Thin-layer chromatogram on kieselgur (neutral) eluant: benzene/methanol (95:5]).

(b) With 2,4,6-trimethylbenzoyl chloride N-[3-(10′, 11′ - dihydro - 5′H-dibenz[b,f]azepin-5′-yl) - propyl] - N-methyl-O-(2,4,6-trimethylbenzoyl)-hydroxylamine, $R_f$=0.75

[Thin-layer chromatogram on kieselgur (neutral) eluant: benzene/methanol (95:5]).

From N-[3-(3′-chloro-10′,11′-dihydro-5′H-dibenz[b,f] azepin-5′-yl)-propyl]-N-methyl-hydroxylamine:

(c) With pivalyl chloride N-[3-(3′-chloro-10′,11′-dihydro-5′H - dibenz[b,f]azepin-5′-yl)-propyl]-N-methyl-O-pivalyl-hydroxylamine, (d) With 2,4,6-trimethylbenzoyl chloride N-[3-(3′-chloro - 10′,11′ - dihydro-5′H-dibenz[b,f]azepin - 5′-yl)-propyl]-N-methyl-O-(2,4,6-trimethylbenzoyl) - hydroxylamine, From N-[3-(3′-chloro - 10′,11′dihydro-5′H-dibenz[b,f] azepin-5′-yl)-2-methyl-propyl]-N-methyl-hydroxylamine:

(e) With pivalyl chloride N-[3-(3′-chloro-10′,11′-dihydro-5′H-dibenz[b,f]azepin-5′-yl)-2-methyl-propyl] - N-methyl-O-pivalyl-hydroxylamine, (f) With 2,4,6-trimethylbenzoyl chloride N-[3-(3′-chloro-10′,11′-dihydro - 5′H - dibenz[b,f]azepin-5′-yl) - 2-methyl-propyl] - N-methyl - O - (2,4,6-trimethylbenzoyl)-hydroxylamine, From N-[3-(3′-methoxy - 10′,11′-dihydro - 5′H-dibenz [b,f]azepin-5′-yl)-propyl]-N-methyl-hydroxylamine:

(g) With pivalyl chloride N-[3-(3′-methoxy-10′,11′-dihydro-5′H-dibenz[b,f]azepin-5′-yl)-propyl] - N-methyl-O-pivalyl-hydroxylamine, (h) With 2,4,6-trimethylbenzoyl chloride N - [3-(3′-methoxy - 10′,11′-dihydro - 5′H-dibenz[b,f]azepin-5′-yl)-propyl]-N-methyl-O-(2,4,6-trimethylbenzoyl) - hydroxylamine, From N-[3-(3′dimethylsulfamyl - 10′,11′-dihydro-5′H-dibenz[b,f]azepin - 5′-yl)-2-methyl-propyl] - N - methyl-hydroxylamine:

(i) With pivalyl chloride N-[3-(3′-dimethylsulfamyl-10′,11′-dihydro-5′H-dibenz[b,f]azepin-5′-yl) - 2 - methyl-propyl]-N-methyl-O-pivalyl-hydroxylamine.

(k) With 2,4,6-trimethylbenzoyl chloride N-[3-(3′-dimethylsulfamyl - 10′,11 - dihydro - 5′H-dibenz[b,f]azepin-5′-yl) - 2-methyl-propyl′]-N-methyl - O - (2,4,6-trimethylbenzoyl)-hydroxylamine.

From N-[3-(3′-ethylthio-10′,11′-dihydro - 5′H - dibenz [b,f]azepin-5′-yl)-2-methyl-propyl] - N - methyl-hydroxylamine:

(l) With pivalyl chloride N-[3-(3′-ethylthio-10′,11′-dihydro-5′H-dibenz[b,f]azepin-5′-yl) - 2-methyl-propyl]-N-methyl-O-pivalyl-hydroxylamine, (m) With 2,4,6-trimethylbenzyl chloride N-[3-(3′-ethylthio-10′,11′-dihydro-5′H-dibenz[b,f]azepin-5′-yl) - 2-methyl-propyl]-N-methyl - O - (2,4,6-trimethylbenzoyl)-hydroxylamine, From N-[3-(3′-trifluoromethyl-10′,11′-dihydro-5′H- dibenz[b,f]azepin-5′-yl)propyl]-N-methyl-hydroxylamine:

(n) With pivalyl chloride N-[3-(3′-trifluoromethyl-10′, 11′ - dihydro - 5′H - dibenz[b,f]azepin-5′-yl)propyl] - N-methyl-O-pivalyl-hydroxylamine, (o) With 2,4,6-trimethylbenzoyl chloride N-[3-(3′-trifluoromethyl - 10′,11′ dihydro-5′H-dibenz[b,f]azepin-5′-yl)propyl] - N-methyl - O - (2,4,6-trimethylbenzoyl)-hydroxylamine, From N - [3-(3′-isopropylthio-10′,11′-dihydro-5′H-dibenz[b,f]azepin-5′-yl)-propyl]-N-methyl-hydroxylamine:

(p) With pivalyl chloride N-[3-(3′-isopropylthio-10′, 11′ - dihydro - 5′H - dibenz[b,f]azepin-5′-yl)-propyl]-N-methyl-O-pivalyl-hydroxylamine, (q) With 2,4,6-trimethylbenzoyl chloride N-[3-(3′-isopropylthio-10′,11′-dihydro-5′H-dibenz[b,f]azepine - 5′-yl)-propyl]-N-methyl-O-(2,4,6-trimethylbenzoyl) - hydroxylamine.

Example 10

(a) 23 g. of moistened 82% benzoyl peroxide are dissolved in 70 ml. of chloroform. This solution is dried over sodium sulfate and diluted with 130 ml. of diethyl ether. A solution of 22.5 g. of 5-(3′-methylamino-propyl)-3-chloro-10,11-dihydro-5H-dibenz[b,f]azepine in 200 ml. of diethyl ether is then added dropwise at 20° within 45 minutes and the reaction mixture is refluxed for 2 hours. It is then cooled, washed at 0 to 5° with water, 2 N hydrochloric acid, water, 2 N potassium hydrogen carbonate solution and water, the organic phase is dried over sodium sulfate and, on obtaining a negative test for peroxide, it is evaporated in vacuo. The residue, which is crystallized from diethylether/petroleum ether, yields N-[3-(3′-chloro - 10′,11′ - dihydro - 5′H - dibenz[b,f]azepin - 5′-yl)-propyl]-N-methyl-O - benzoyl - hydroxylamine which melts at 90–91°.

Example 11

The following compounds are obtained analogously to Example 10 with benzoyl peroxide:

(a) From 5-(3′ - methylamino - propyl) - 3-methoxy-10,11-dihydro-5H-dibenz[b,f]azepine, there is obtained N - [3 - (3' - methoxy - 10',11' - dihydro - 5'H - dibenz-[b,f]azepin - 5' - yl) - propyl] - N - methyl - O - benzoyl-hydroxylamine; $R_f=0.80$. [Thin layer chromatogram on kieselgur (neutral), eluant: benzene/methanol (volume ratio 95:5)], (b) From 5 - (3' - methylamino - 2' - methyl-propyl) -3-chloro-10,11-dihydro-5H-dibenz[b,f]azepine, there is obtained N - [3-(3'-chloro-10',11'-dihydro-5'H-dibenz[b,f]azepin- 5' - yl) - 2 - methyl - propyl] - N - methyl - O - benzoyl-hydroxylamine; M.P. 112–114° from methanol, (c) From 5 - (2' - methylamino-ethyl)-3-dimethylsulfamyl-10,11-dihydro-5H-dibenz[b,f]azepine, there is obtained N - [2 - (3'-dimethylsulfamyl-10',11'-dihydro-5'H-dibenz[b,f]azepin - 5' - yl) - ethyl] - N - methyl - O - benzoyl-hydroxylamine; $R_f=0.80$. (Thin-layer chromatogram on kieselgur (neutral); eluant: glacial acetic acid/ethyl acetate/conc. hydrochloric acid/water (volume ratio 35:55:5:5)], (d) From 5 - (3' - methylamino - 2' - methylpropyl) -3-ethylthio-5H-dibenz[b,f]azepine, there is obtained N-[3-(3' - ethylthio - 5'H - dibenz[b,f]azepin - 5' - yl) - 2 -methylpropyl]-N-methyl-O-benzoyl-hydroxylamine, $R_f=0.87$. [Thin-layer chromatogram on kieselgur (neutral); eluant: benzene/methanol (volume ratio 3:1)], (e) From 5-(3'-methylamino-2'-methyl-propyl)-3-dimethylsulfamyl - 10,11 - dihydro - 5H - dibenz[b,f]azepine, there is obtained N-[3-(3'-dimethyl-sulfamyl-10',11'-dihydro - 5'H-dibenz[b,f]azepin-5'-yl)-2-methyl-propyl]-N-methyl-O-benzoyl - hydroxylamine, $R_f=0.74$. [Thin-layer chromatogram on kieselgur (neutral), eluant: glacial acetic acid/ethyl acetate/conc. hydrochloric acid/water (volume ratio 35:55:5:5)], (f) From 5-(3' - methylamino - propyl)-3-ethyl-10,11-dihydro-5H-dibenz[b,f]azepine, there is obtained N-[3-(3' - ethyl - 10',11' - dihydro - 5'H - dibenz[b,f]azepin-5'-yl)-propyl]-N-methyl-O-benzoyl-hydroxylamine;

(g) From 5-(3' - methylamino-propyl)-3-acetyl-10,11-dihydro-5H-dibenz[b,f]azepine, there is obtained N-[3-(3' - acetyl - 10',11' - dihydro - 5'H - dibenz[b,f]azepin-5'-yl)-propyl]-N-methyl-O-benzoyl-hydroxylamine;

(h) From 5 - (3' - methylamino - 2'-methyl-propyl)-3-methylsulfonyl-10,11 - dihydro - 5H - dibenz[b,f]azepine, there is obtained N-[3-(3'-methyl-sulfonyl-10',11'-dihydro - 5'H - dibenz[b,f]azepin - 5' - yl) - 2 - methyl - propyl]-N-methyl-O-benzoyl-hydroxylamine;

(i) From 5 - (3' - methylamino-propyl)-3-methylthio-10,11-dihydro-5H-dibenz[b,f]azepine, there is obtained N-[3 - (3' - methylthio - 10',11' - dihydro - 5'H - dibenz-[b,f]azepin - 5' - yl) - propyl] - N - methyl - O - benzoyl-hydroxylamine;

(j) From 5-(3'-methylamino-propyl)-3-isopropylthio-10,11-dihydro-5H-dibenz[b,f]azepine, there is obtained N - [3 - (3' - isopropylthio - 10',11 - dihydro - 5'H-dibenz-[b,f]azepin - 5' - yl) - propyl] - N - methyl - O - benzoyl-hydroxylamine;

(k) From 5 - (3' - methylamino - propyl) - 3-trifluoromethyl-10,11-dihydro-5H-dibenz[b,f]azepine, there is obtained N - [3-(3'-trifluoromethyl-10',11'-dihydro-5'H-dibenz[b,f]azepin - 5' - yl) - propyl] - N - methyl - O - benzoyl-hydroxylamine; and (l) From 5 - (3' - methylamino-propyl)-3-amyl-10,11-dihydro-5H-dibenz[b,f]azepine, there is obtained N-[3-(3' - amyl - 10',11' - dihydro - 5'H - dibenz[b,f]azepin-5'-yl)-propyl]-N-methyl-O-benzoyl-hydroxylamine.

*Example 12*

11 g. of N-[3-(3'-chloro-10',11'-dihydro-5'H-dibenz-[b,f]azepin - 5' - yl)-propyl] - N - methyl - O - benzoyl-hydroxylamine, 3 g. of potassium hydroxide and 100 ml. of ethanol/water 6:4 are refluxed for 14 hours under an atmosphere of nitrogen. The ethanol is then evaporated off in vacuo and the aqueous residue is extracted with diethyl ether. The etheral extract is washed with water, 2 N sodium carbonate solution and water, dried over sodium sulfate and evaporated in vacuo to dryness. The residue, the N-[3-(3'-chloro-10',11'-dihydro-5'H-dibenz-[b,f]azepin-5'-yl)-propyl]-N-methyl - hydroxylamine obtained, is converted with ethereal hydrochloric acid into the hydrochloride. Recrystallized from chloroform/diethyl ether, the hydrochloride melts at 148–150°.

*Example 13*

The following compounds are obtained analogously to Example 12 with potassium hydroxide in aqueous ethanol:

(a) From N - [3 - (3' - methoxy - 10',11' - dihydro-5'H - dibenz[b,f]azepin - 5' - yl) - propyl] - N - methyl-O - benzoyl - hydroxylamine, N - [3 - (3' - methoxy-10',11' - dihydro - 5'H - dibenz[b,f]azepin - 5' - yl)-propyl]-N-methyl-hydroxylamine, $R_f=0.55$. [Thin-layer chromatogram on kieselgur (neutral), eluant: benzene/methanol (volume ratio 95:5)], (b) From N - [3 - (3' - chloro - 10',11' - dihydro-5'H - dibenz[b,f]azepin - 5' - yl) - 2 - methyl - propyl]-N - methyl - O - benzoyl - hydroxylamine, N - [3 - (3'-chloro - 10',11' - dihydro - 5'H - dibenz[b,f]azepin - 5'-yl) - 2 - methyl - propyl] - N - methyl - hydroxylamine, M.P. 94–95.5° from ether/petroleum.

(c) From N - [2 - (3' - dimethylsulfamyl - 10',11' - dihydro - 5'H - dibenz[b,f]azepin - 5' - yl) - ethyl] - N-methyl - O - benzoyl - hydroxylamine, N - [2 - (3' - dimethylsulfamyl-10',11'-dihydro-5'H-dibenz[b,f]azepin-5'-yl)-ethyl]-N-methyl-hydroxylamine, $R_f=0.61$. [Thin-layer chromatogram on kieselgur (neutral) eluant: glacial acetic acid/ethyl acetate/conc. hydrochloric acid/water (volume ratio 35:55:5:5)], (d) From N - [3 - (3' - ethylthio - 5'H - dibenz[b,f] azepin - 5' - yl) - 2 - methylpropyl] - N - methyl - O-benzoyl - hydroxylamine, N - [3 - (3' - ethylthio - 5'H-dibenz[b,f]azepin - 5' - yl) - 2 - methylpropyl] - N - methyl-hydroxylamine, $R_f=0.83$. [Thin-layer chromatogram on kieselgur (neutral), eluant: benzene/methanol (volume ratio 3:1)], (e) From N - [3 - (3' - dimethylsulfamyl - 10',11'-dihydro - 5'H - dibenz[b,f]azepin - 5' - yl) - 2 methylpropyl] - N - methyl - O - benzoyl - hydroxylamine, N-[3 - (3' - dimethylsulfamyl - 10',11' - dihydro-5'H-dibenz-[b,f]azepin - 5' - yl) - 2 - methylpropyl] - N - methyl - hydroxylamine, $R_f=0.62$. [Thin-layer chromatogram on kieselgur (neutral), eluant: glacial acetic acid/ethyl acetate/conc. hydrochloric acid/water (volume ratio 35:55::5:5)], (f) From N - [3 - (3' - ethyl - 10',11' - dihydro - 5'H-dibenz[b,f]azepin - 5' - yl) - propyl] - N - methyl - O-benzoyl - hydroxylamine, N - [3 - (3' - ethyl - 10',11'-dihydro - 5'H - dibenz[b,f]azepin - 5' - yl) - propyl] - N-methylhydroxylamine, (g) From N - [3 - (3' - acetyl - 10',11' - dihydro - 5'H-dibenz[b,f]azepin - 5' - yl) - propyl] - N - methyl - O-benzoyl - hydroxylamine, N - [3 - (3' - acetyl - 10',11'-dihydro - 5'H - dibenz[b,f]azepin - 5' - yl) - propyl] - N-methyl-hydroxylamine, (h) From N - [3 - (3' - methylsulfonyl - 10',11' - dihydro - 5'H - dibenz[b,f]azepin - 5' - yl) - 2 - methylpropyl] - N - methyl - O - benzoyl - hydroxylamine, N-[3 - (3' - methylsulfonyl - 10',11' - dihydro - 5'H - dibenz-[b,f]azepin - 5' - yl) - 2 - methyl - propyl] - N - methyl-hydroxylamine, (i) From N - [3 - (3' - methylthio - 10',11' - dihydro-5'H - dibenz[b,f]azepin - 5' - yl) - propyl] - N - methyl-O - benzoyl - hydroxylamine, N - [3 - (3' - methylthio-10',11' - dihydro - 5'H - dibenz[b,f]azepin - 5' - yl)-propyl]-N-methyl-hydroxylamine, (j) From N - [3 - (3' - isopropylthio - 10',11' - dihydro-5'H - dibenz[b,f]azepin - 5' - yl) - propyl] - N - methyl-O - benzoyl - hydroxylamine, N - [3 - (3' - isopropylthio-10',11' - dihydro - 5'H - dibenz[b,f]azepin - 5' - yl)-propyl]-N-methyl-hydroxylamine, (k) From N - [3 - (3' - trifluoromethyl - 10',11' - dihydro - 5'H - dibenz[b,f]azepine - 5' - yl) - propyl] - N- methyl-O-benzoyl-hydroxylamine, there is obtained N-[3-(3' - trifluoromethyl - 10',11' - dihydro - 5'H - dibenz-[b,f]azepin - 5' - yl) - propyl] - N - methyl - hydroxylamine, and (1) From N - [3 - (3' - amyl - 10',11' - dihydro - 5'H-dibenz[b,f]azepine - 5' - yl) - propyl] - N - methyl - O-benzoyl-hydroxylamine, there is obtained N-[3-(3'-amyl-10',11' - dihydro - 5'H - dibenz[b,f]azepin - 5' - yl)-propyl]-N-methyl-hydroxylamine.

We claim:
1. An antidepressive azepine derivative of the formula

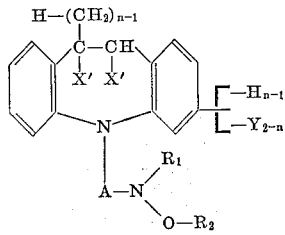

wherein
n is one of the integers 1 and 2,
both X"s represent a member selected from the group consisting of a pair of hydrogen atoms and a second bond between the carbon atoms to which the X's are attached,
Y represents a member selected from the group consisting of chlorine, alkoxy of from 1 to 5 carbon atoms, lower alkylthio, trifluoromethyl, lower alkanoyl, lower alkylsulfonyl and lower alkyl-substituted sulfamyl,

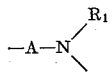

represents a member selected from the class consisting of
(a) the grouping

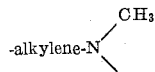

wherein alkylene has from two to four carbon atoms at least two of which are straight-enchained between the two nitrogen atoms in the above formula,
(b) C-pyrrolidinyl-alkyl,
(c) C-piperidinyl-alkyl and
(d) C-hexahydroazepinyl-alkyl,
"alkyl" in (b), (c) and (d) having from one to two carbon atoms, and
$R_2$ represents a member selected from the group consisting of hydrogen and the acyl radicals of a total of from 2 to at most 10 carbon atoms, of saturated aliphatic hydrocarbon monocarboxylic acid, saturated aliphatic hydrocarbon dicarboxylic acid, mononuclear carboxylic aromatic hydrocarbon monocarboxylic acid and mononuclear carboxylic aromatic hydrocarbon dicarboxylic acid.

2. N - [3 - (10',11' - dihydro - 5'H - dibenz[b,f]azepin-5'-yl)-propyl]-N-methyl-hydroxylamine.
3. N - [3 - (10',11' - dihydro - 5'H - dibenz[b,f]azepin-5'-yl)-propyl]-N-methyl-O-benzoyl-hydroxylamine.
4. N - [3 - (10',11' - dihydro - 5'H - dibenz[b,f]azepin-5-yl)-propyl]-N-methyl-O-pivalyl-hydroxylamine.
5. N - [3 - (10',11' - dihydro - 5'H - dibenz[b,f]azepin-5'-yl)-propyl]-N-methyl - O - (2,4,6 - trimethylbenzoyl)-hydroxylamine.
6. N - [3 - (10',11' - dihydro - 5'H - dibenz[b,f]azepin-5' - yl) - 2 - methylpropyl] - N - methyl - O - benzoyl-hydroxylamine.
7. N - [3 - (5'H - dibenz[b,f]azepin - 5' - yl) - propyl]-N-methyl-O-benzoyl-hydroxylamine.
8. N - [3 - (3' - chloro - 10',11' - dihydro - 5'H - dibenz-[b,f]azepin - 5' - yl) - propyl] - N - methyl - O - benzoyl-hydroxylamine.
9. N - [3 - (3' - chloro - 10',11' - dihydro - 5'H - dibenz-[b,f]azepin - 5' - yl) - 2 - methyl - propyl] - N - methyl-O-benzoyl-hydroxylamine.
10. N - [3 - (3' - methoxy - 10',11' - dihydro - 5'H - dibenz[b,f]azepin - 5' - yl) - propyl] - N - methyl - O-benzoyl-hydroxylamine.
11. N - [3 - (3' - ethylthio - 5'H - dibenz[b,f]azepin-5' - yl) - 2 - methylpropyl] - N - methyl - O - benzoyl-hydroxylamine.
12. N - [3 - 3' - trifluoromethyl - 10',11' - dihydro - 5'H-dibenz[b,f]azepin - 5' - yl) - propyl] - N - methyl - O-benzoyl-hydroxylamine.
13. N - [3 - (3' - isopropylthio - 10',11' - dihydro - 5'H-dibenz[b,f]azepin - 5' - yl) - propyl] - N - methyl - O-benzoyl-hydroxylamine.
14. N - [3 - (3' - dimethyl - sulfamyl - 10',11' - dihydro-5'H - dibenz[b,f]azepin - 5' - yl) - 2 - methyl - propyl] - N-methyl-O-benzoyl-hydroxylamine.

No references cited.

ALEX MAZEL, *Primary Examiner.*
A. ROLLINS, *Assistant Examiner.*

UNITED STATES PATENT OFFICE
CERTIFICATE OF CORRECTION

Patent No. 3,337,534                                      August 22, 1967

Herbert Schröter et al.

It is hereby certified that error appears in the above numbered patent requiring correction and that the said Letters Patent should read as corrected below.

Column 6, line 38, for "5H" read -- 5′H --; column 7, line 13, for "propyl" read -- propyl] --; line 50, for "11" read -- 11′ --; column 8, line 21, for "11-" read -- 11′- --; column 10, line 47, for "35:55::5:5)]" read -- 35:55:5:5)] --.

Signed and sealed this 10th day of December 1968.

(SEAL)
Attest:

Edward M. Fletcher, Jr.                                   EDWARD J. BRENNER

Attesting Officer                                                    Commissioner of Patents